Aug. 1, 1939.  J. G. DICKSON  2,167,643
GASKET
Filed Nov. 5, 1936    2 Sheets-Sheet 1

Inventor
James G. Dickson
by Parker & Carter
Attorneys.

Aug. 1, 1939.   J. G. DICKSON   2,167,643
GASKET
Filed Nov. 5, 1936   2 Sheets-Sheet 2
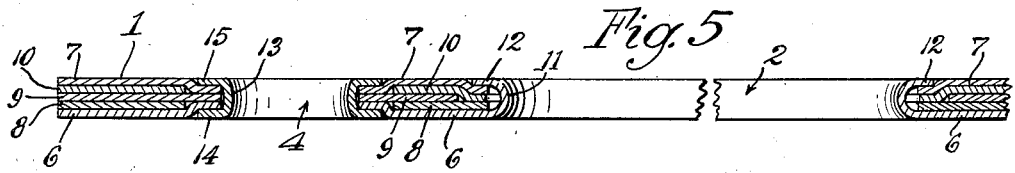
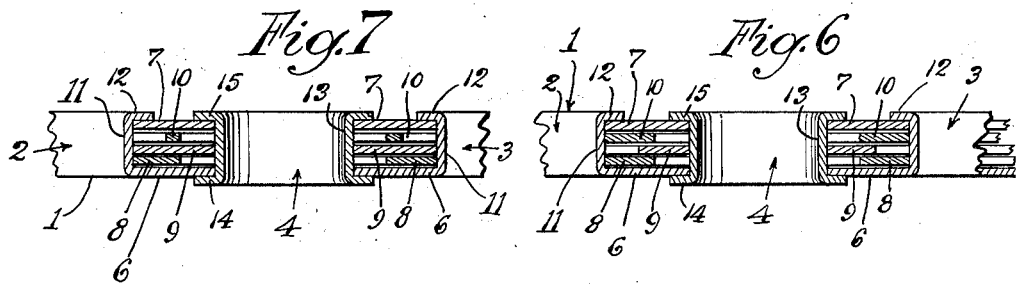
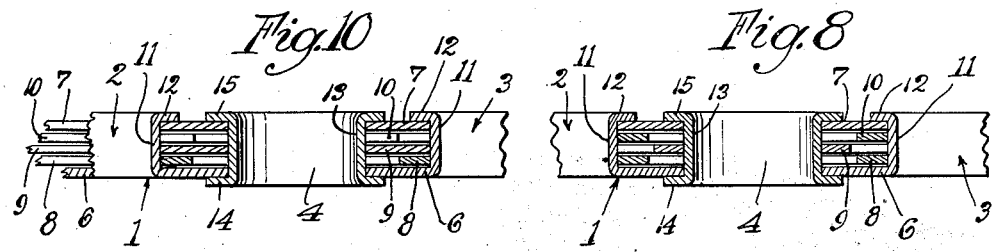
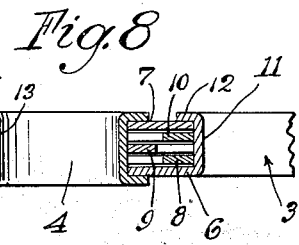
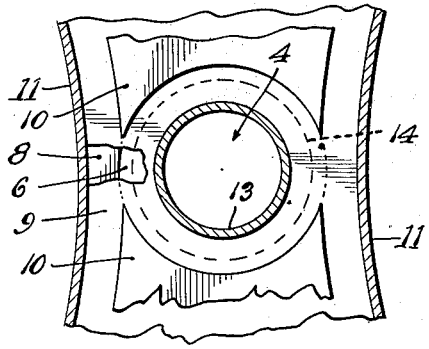
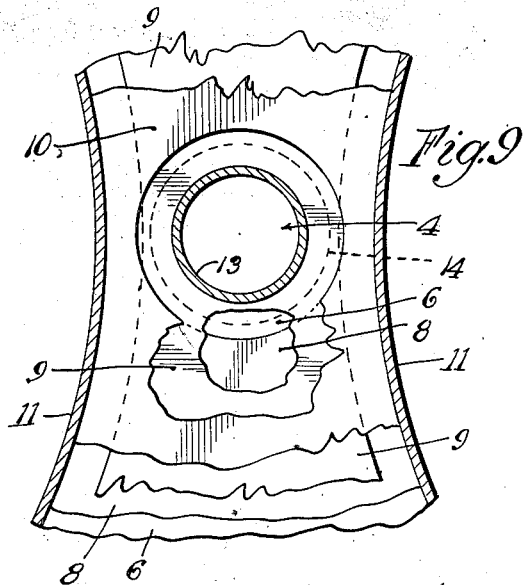
Inventor
James G. Dickson
by Parker & Carter
Attorneys.

Patented Aug. 1, 1939

2,167,643

UNITED STATES PATENT OFFICE 2,167,643

GASKET

James G. Dickson, Glencoe, Ill., assignor to Dickson Gasket Company, Chicago, Ill., a corporation of Illinois Application November 5, 1936, Serial No. 109,263

4 Claims. (Cl. 288—32)

My invention relates to improvements in gaskets for internal combustion engines and the like and has for one object to provide a new and improved type of all metal gasket wherein the thickness of the gasket is substantially the same throughout its entire area.

Another object of my invention is to provide a form of all metal gasket wherein some of the filling laminae may be cut back or reduced in thickness to compensate for the turned back portion of the grommet or other means which hold the gasket forming laminae together.

Another object is to provide a gasket which will be gas and water tight throughout substantially its entire area under all operating conditions.

My invention is illustrated more or less diagrammatically in the accompanying drawings, wherein Figure 1 is a plan view;

Figure 5 is a longitudinal section through a gasket according to my invention after the parts have been compressed;

Figure 6 is a diagrammatic section through a part of a gasket according to my invention;

Figure 7 is a contrasting section showing for purposes of comparison the type of gasket of my above mentioned earlier patent;

Figures 8 and 9 are respectively vertical and horizontal sections through a slightly different arrangement of my improved gasket;

Figures 10 and 11 are similar sections through a similar type of gasket which for purposes of illustration and comparison discloses the device of my Patent Number 2,034,610;

Like parts are illustrated by like characters throughout the specification and drawings.

Figure 13:
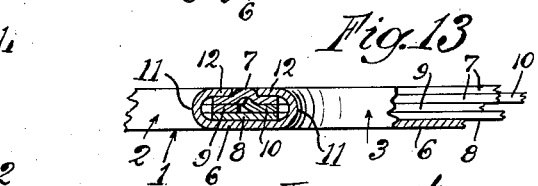
Figure 13 shows them compressed in final position.

It will be noted in referring to the drawings that in a number of instances the gasket is shown before the grommet or the holding flange has been compressed to compact the gasket into the form it will assume when in the engines. This has been done for purposes of illustration because the arrangement of the laminae is thereby more clear and definite and easier to understand but it will be understood that Figures 5 and 13 show the actual gasket after the parts have been compressed.

It will be understood also that various figures showing different arrangements all disclose the same invention except in so far as they illustrate the earlier type and are shown in detail to show different uses of the same invention.

1 is an internal combustion engine gasket. 2, 3 are the apertures in the gasket which enclose the combustion chamber, the round portion of course enclosing a part of the cylinder and the portion at the top of the figure enclosing the valve pockets. 4, 4, are the apertures which permit communication between the water spaces or jacket in the head and in the cylinder block. 5, 5 are bolt holes for the bolts joining and holding together the head and the cylinder block.

The gasket comprises a bottom plate 6, a top or cover plate 7, and intermediate filler plates or laminae 8, 9, 10, though it will be understood, of course, that there might be more or less of these filler plates or laminae. It will also be understood that these plates or laminae are all of them very thin and very flexible and there will always be some clearance between these plates and some air always entrapped between them, which adds to their flexibility and to their adjustability and assists in making it possible to obtain a satisfactory gas tight joint. These plates are all apertured in register. The bottom plate is provided with an inwardly and upwardly bent thimble-like portion 11, which extends through and bounds one or more of the apertures and this portion is outwardly flanged as at 12, to overlie the cover plate. Other of the apertures are lined by a separate grommet 13, having flanges 14 and 15 overlying the bottom and the cover plate.

Figure 1:
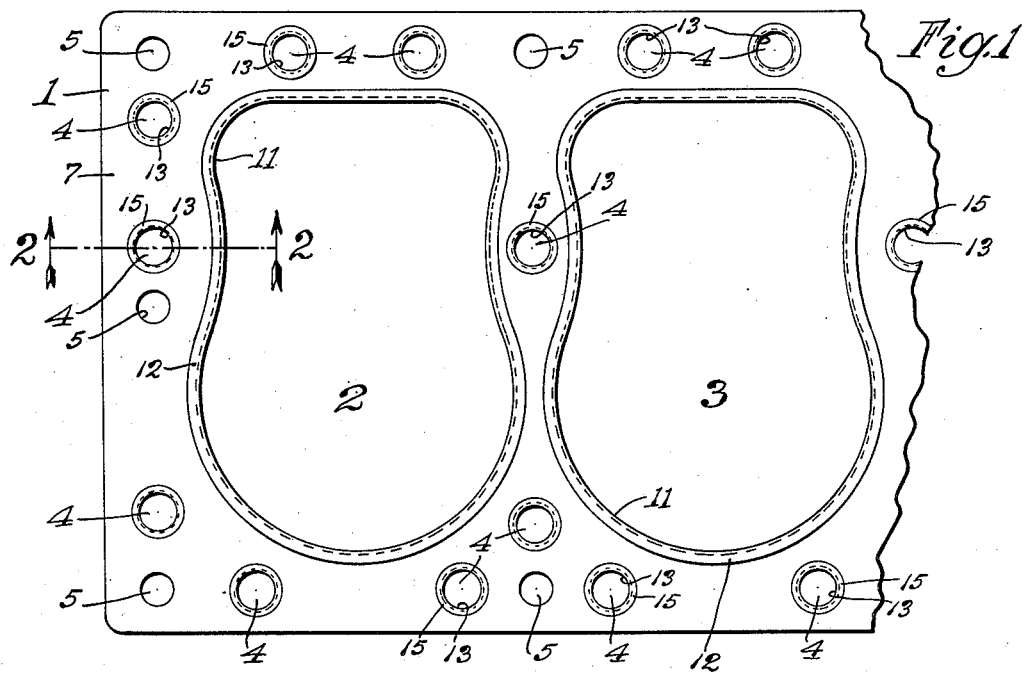
Figures 2, 3:
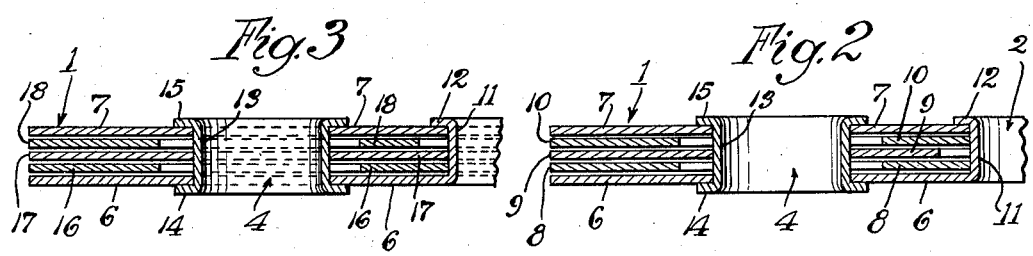
Figure 2 is a section taken along the line 2—2 of Figure 1.
Figure 3 is a section similar to Figure 2 illustrating the type of gasket shown in my United States Letters Patent No. 2,034,610, upon which the invention herein disclosed is an improvement.
Figure 4:
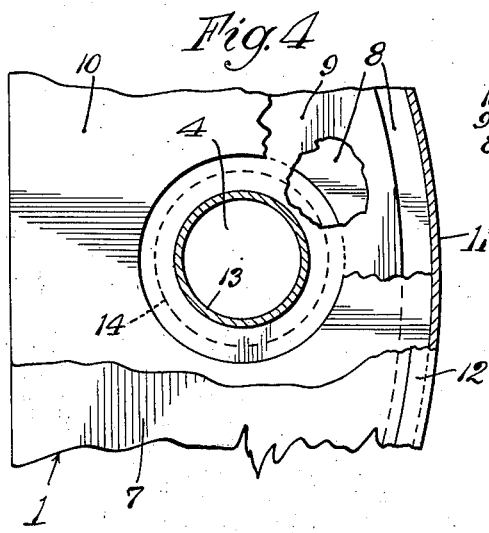
Figure 4 is a detail plan view with parts in section and parts removed of Figure 2.
Figure 12:
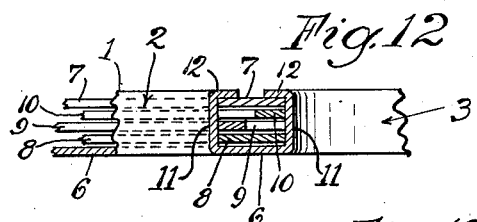
Figure 12 is a section through a further illustration of my type of gasket before the parts are compressed.

In order that when the gasket is collapsed and compacted into the size and shape it is to assume in the engine, it may be gas and water tight in its contact throughout its entire area between the mating or the opposed surfaces of the cylinder head or cylinder block. It will be noted that some of the laminae are cut away. In Figure 2 for instance, the lamina 9, one of the intermediate laminae is cut away. This lamina is substantially the same thickness as the flange 12 so that when the gasket is compacted as shown in Figure 5, the lamina 10 is pressed down into the area left by cutting away the lamina 9 and the cover plate 7 is similarly pressed down so that the flange 12 is flush with the cover plate 7.

In case of the grommet 13, the laminae 10 and 12 are cut away so as to leave clearance for the flanges 14 and 15 so that when the gasket is compacted, the two ends of the grommet are flush with the bottom plate 6, and the cover plate 7.

Attention is now called to the comparison between Figure 2 and Figure 3. There the bottom plate 6, the cover plate 7, the thimble 11, the flange 12, the grommet 13, the flanges 14 and 15 are all the same as in Figure 2. However, the filler plates 16, 17 and 18 are differently treated. Instead of cutting away the filler plate 17 which is the equivalent of the filler plate 9 to take care of the flange 12 and cutting away the plates 16 and 18, to take care of the flanges 14 and 15, equivalent to cutting away the plates 8 and 10, the cut back or cut away portion is localized in two plates only. The result of this is especially as shown in connection with such figures as Figures 7, 10 and 11, that when the apertures are too close together as shown especially in Figures 10 and 11, the two cut back portions meet and you have no gasket lamina there at all. This is obviated as indicated by Figures 6, 8 and 9, as well as 12 and 13 by staggering the cut back or reduction in thickness for one aperture is in one plate and for the other aperture is in another plate and the result is there is always a body of gasket forming lamina continuous throughout the area of the gasket, the cut backs intermeshing as indicated especially in Figure 13 but there is thus never any place on the gasket where there is a direct connection between any two of the apertures in any single lamina.

Experience teaches that this staggering of the cut back or reduced portion of the gasket lamina is of the utmost importance because it prevents leakage around the ends or edges of the laminae from one aperture to another and makes it possible to have a continuously gas tight gasket.

Experience has taught that when gaskets of the type characteristic of the cylinder head of an internal combustion engine are to be used wherein relatively wide areas are to be made gas tight, more than a single metallic filler lamina is required. Preferably at least three filler plates in addition to the top and bottom lamina are used though under some circumstances as few as a total of four may be used. This is exceedingly important in connection with the staggered cut back invention because it means that the use of a plurality of filler plates which is characteristic of the staggered cut back idea is equally important in connection with the necessity of providing multiplicity of laminae.

The reason for the necessity of a multiplicity of laminae is that if but two or three are used, the characteristic irregularities resulting from the normal commercial manufacture of cylinder blocks and cylinder heads may be so great that too small a number of laminae thin enough to have sealing effect characteristic of my gaskets are not sufficient to take care of variations in thickness, contour roughness and smoothness of the surfaces. If thick plates are used, then the characteristic flexibility upon which my gasket relies for its adequate sealing is lost and sealing must be obtained by actual crushing of the metal between the surfaces and this is not satisfactory because that results in distortion of the metal of the head and block itself and leads to destruction at worst and unsatisfactory operation and reduced life at best, and also because experience teaches that when a solid gasket is used, which lacks the characteristic flexibility of the laminated gasket, then even though it may be tight when the engine is hot, the solid gasket will not expand to maintain tightness when the engine is cold.

Experience has taught that the best solution of the problem contemplates the use of a minimum of five or even more laminae with a total of four being perhaps possible under some circumstances and this is a fact even though the cut back gasket is not used though if the cut back feature is not used, then in order to get satisfactory operation, it becomes necessary to pre-crush the gasket, upset and flow the metal away from the area where the flanges appear so as to get a paralleled wall gasket.

I claim:

1. An all metal gasket comprising two outside and one or more inside laminae of sheet metal, a plurality of apertures through the gasket and flanged holding means extending through said apertures, one or more of the inside laminae being cut back around each of two adjacent apertures past the line of the outer edge of the flanged portion of the holding means, the lamina which is cut back with respect to one aperture extending clear up to and closely encircling the other aperture whereby no lamina is cut back enough to remove all the metal between any two adjacent apertures.

2. A gasket comprising a plurality of parallel thin, flat metallic laminae, spaced registering apertures therethrough, holding means extending through said apertures, bounding them and flanged to overlie the body of the gasket, one of the laminae adjacent each of said apertures being cut away to provide clearance for the flanged holding portions, the lamina cut away adjacent one aperture extending continuously to and closely encircling an adjacent aperture.

3. A gasket comprising a plurality of thin flexible metallic laminae, registering apertures extending through all of said laminae, flanged means extending through and bounding said apertures and overlying the body of the gasket to hold the laminae together, alternate laminae being cut away about adjacent apertures to provide clearance for the flanged holding means.

4. A gasket comprising two outside and a plurality of inside laminae, there being a plurality of aligned spaced apertures through them, means extending through some of said apertures and having a portion extending laterally over the face of an outside lamina about each such aperture for holding the several laminae together, the total thickness of the inside laminae beneath each such laterally extending means being less than the total thickness of the same laminae beyond the laterally extending means by an amount approximately equal to the thickness of the laterally extending portion, such reduction in thickness being distributed between the various inside laminae so that the reduction in thickness adjacent one laterally extended means is formed by inside laminae different from the reduction in thickness associated with an adjacent laterally extended means.

JAMES G. DICKSON.